United States Patent
Nakamura et al.

(10) Patent No.: US 7,272,313 B2
(45) Date of Patent: Sep. 18, 2007

(54) SYSTEM WITH NODE APPARATUSES IN IP/WDM NETWORK

(75) Inventors: Hajime Nakamura, Saitama (JP); Hiroyuki Yokoyama, Saitama (JP)

(73) Assignee: KDDI Corporation, Tokyo (JP)

( * ) Notice: Subject to any disclaimer, the term of this patent is extended or adjusted under 35 U.S.C. 154(b) by 952 days.

(21) Appl. No.: 10/397,210

(22) Filed: Mar. 27, 2003

(65) Prior Publication Data

US 2004/0042392 A1    Mar. 4, 2004

(30) Foreign Application Priority Data

Mar. 29, 2002    (JP)    ................ 2002-095669

(51) Int. Cl.
*H04J 14/00* (2006.01)
*G02B 6/28* (2006.01)

(52) U.S. Cl. .......................... 398/51; 398/66

(58) Field of Classification Search ................ 398/3–5, 398/43–73

See application file for complete search history.

(56) References Cited

U.S. PATENT DOCUMENTS 5,367,586 A * 11/1994 Glance et al. ................ 385/24
5,400,162 A *  3/1995 Newberg et al. ............. 398/45
6,819,870 B1* 11/2004 Ge et al. ..................... 398/51

FOREIGN PATENT DOCUMENTS

JP    2000-224194    8/2000
JP    2001-333045    11/2001

OTHER PUBLICATIONS

Hajime Nakamura, et al. "Proposal of Statistical Lambda Multiplexing Network (SLAMNet)" Globecom 2000, IEEE Global Telecommunications Conference, San Francisco, Nov. 27-Dec. 1, 2000, 6 pages.

* cited by examiner

*Primary Examiner*—Jason Chan
*Assistant Examiner*—Danny Wai Lun Leung
(74) *Attorney, Agent, or Firm*—Oblon, Spivak, McClelland, Maier & Neustadt, P.C.

(57) ABSTRACT

A system, including: a source node apparatus; a destination node apparatus; the source node apparatus and the destination node apparatus both being in an Internet Protocol/Wavelength Division Multiplexing network; an initial path connecting the source node apparatus to the destination node apparatus; a first router associated with the source node apparatus; a second router associated with the destination node apparatus; and a optical cross-connect associated with the source node apparatus and configured to add and delete at least one additional path between the first and second routers, the first optical cross-connect configured to add and delete the at least one additional path independently and asynchronously of a traffic variation without signaling the destination node apparatus.

4 Claims, 7 Drawing Sheets

SYSTEM WITH NODE APPARATUSES IN IP/WDM NETWORK

FIELD OF THE INVENTION

The present invention relates to a system with a source node apparatus and a destination node apparatus in IP (Internet Protocol)/WDM (Wavelength Division Multiplexing) network. In particular, the present invention relates to node apparatuses for establishing an initial path and additional paths between routers to be communicated, and for adding and deleting the additional path independently and asynchronously dependent on traffic without using signaling.

DESCRIPTION OF THE RELATED ART

With an increase of IP traffic in the Internet, the need for increasing the speed of the node apparatuses in the IP/WDM network has intensified. Each node apparatus is required to enhance an availability of the path in response to the applied traffic. Therefore, required has been a technique for dynamically adding and deleting the wavelength path between the node apparatuses so as to enhance the resource availability. As is known, "traffic" means the number of transmission bytes or transmission packets per unit of time.

FIG. 1 illustrates a system configuration with conventional node apparatuses.

In this system, router 31 or 32 connected with a source node apparatus 1 communicates with router 41 or 42 connected with a destination node apparatus 2 in a one to one relationship. Each router is connected to the node apparatus through an access-line, and the source node apparatus 1 is connected to the destination node apparatus 2 through a basic trunk-line.

In the source node apparatus 1, packets received from the router 31 or 32 through the access-line are input into optical buffer 12-31 or 12-32, respectively. The output of the optical buffer branches to an initial path and additional paths. The initial path is fixed and always used. On the other hand, the additional paths are used when the traffic exceeds a transmission capacity of the initial path. The number of the additional paths is determined dependent on the maximum traffic between the routers. That is, the packets are first transmitted through the initial path and then through the additional paths of the requested number in the order of adding.

The additional paths are connected to the optical cross-connect 10. A traffic monitor 11 measures the traffic of the initial path and the additional paths, and also at least the traffic variation of the additional path added. Furthermore, the traffic monitor 11 determines the addition and deletion of an additional path dependent on the measured traffic. The determination is notified to the optical cross-connect 10, and then the optical cross-connect 10 adds or deletes the additional path. At this time, the optical cross-connect 10 adds the additional path independently and asynchronously, without signaling for adding the additional path to the optical cross-connect 20 in the destination node apparatus 2.

The destination node apparatus 2 is provided with a traffic monitor 21 for measuring the traffic of the initial path and the additional paths connected between this destination node apparatus 1 and the source node apparatus 1. The optical cross-connect 20 in the destination node apparatus 2 adds the additional path independently and asynchronously, without signaling for adding the additional path connected to the optical cross-connect 10 in the source node apparatus 1.

Since the number of the additional paths used between the node apparatuses is controlled, the speed that takes out packets from the buffer can be controlled, and the resource availability can be improved. Furthermore, since both node apparatuses add and delete the additional paths independently and asynchronously, the rapid adding and deleting control of the additional path can be expected.

FIG. 2 illustrates a sequence between the conventional node apparatuses for adding and deleting additional paths independently and asynchronously.

Such technique is disclosed in JP333045/2001-A "IP/WDM node apparatus", and in H. Nakamura, T. Kato, H. Yokoyama, S. Yamamoto, "Proposal of Statistical Lambda Multiplexing Networks" (SLAM Net), Proc. GLOBECOM 2000, p.3-6, 2000.

As shown in FIG. 2, packets transmitted from the router 31 are received by the router 41 through the node apparatuses 1 and 2. Usually, between the node apparatuses 1 and 2, at first, a single initial path (transmission channel) is kept for the router 31 and the router 41. When the traffic between them exceeds the transmission capacity of the initial path, the node apparatuses 1 and 2 respectively add additional paths independently and asynchronously. When the traffic decreases and the additional path added lastly is not used, the node apparatuses 1 and 2 delete the last additional path independently and asynchronously.

According to this conventional technique, since the source node apparatus 1 and the destination node apparatus 2 add and delete the additional path independently and asynchronously, the rapid adding and deleting control of the additional paths becomes possible. At this time, a predetermined period of time is necessary to add the additional path, and no packet loss due to buffer overflow is allowed. Therefore, traffic at a predetermined time later is predicted dependent on the measured traffic. Based on the predicted result, an additional path is added in advance. However, if the IP traffic varies abruptly, an additional path added based on the predicted result may be deleted without being used for transmitting data. That is, the conventional technique has a problem that the availability of the additional path depends on the prediction accuracy of the traffic.

Furthermore, according to the conventional technique, path addition requests may occur in the two access-lines at substantially the same time, that is, within a delay difference between wave lengths of signals passing through the same optical fiber, in a case that additional paths between the node apparatuses are selected in a fixed order for example. At this time, if the source node apparatus judges that a path addition request occurs with respect to the access-line 2 after a path addition request for the access-line 1, and if the destination node apparatus judges that a path addition request occurs with respect to the access-line 1 after a path addition request for the access-line 2, the judged order of the path addition requests is opposed between the node apparatuses. In this case, the source node apparatus will select the additional path 1 to the access-line 1 and then the additional path 2 to the access-line 2. On the other hand, the destination node apparatus will select the additional path 1 to the access-line 2 and then the additional path 1 to the access-line 1. As a result, no communication through the additional paths is possible, and the additional paths will be deleted after a lapse of a fixed time. That is, is the conventional technique has a problem that the additional path added by the source node apparatus and the additional path added by the destination node apparatus do not become coincidences due to a slight difference in time and to control errors.

SUMMARY OF THE INVENTION

The present invention aims to provide a system with node apparatuses in IP/WDM network, for adding and deleting an additional path independently and asynchronously dependent on an actual traffic without predicting the traffic.

Furthermore, the present invention aims to provide a system with node apparatuses in IP/WDM network, whereby the same additional path is certainly selected by both node apparatuses.

The present invention concerns a system with a source node apparatus and a destination node apparatus in Internet Protocol/Wavelength Division Multiplexing network, both the node apparatuses having an initial path and at least one additional path between routers to be communicated, and adding and deleting the at least one additional path independently and asynchronously dependent on a traffic variation without signaling.

In particular, according to the present invention, in the source node apparatus, the at least one additional path has i optical delay lines numerically equal to the sequence i of addition, where i is a positive integer, in the destination node apparatus, the initial path has n optical delay lines numerically equal to the number n of the added at least one additional path, and the at least one additional path has n–i optical delay lines numerically equal to a difference between the number n and the number i, where n is a positive integer, and each optical delay line delays packets for a period of time that is necessary to add one additional path.

It is preferred that the destination node apparatus comprises means for changing the number n of the optical delay lines inserted to the initial path dependent on addition and deletion of the at least one additional path.

It is also preferred that the source node apparatus comprises an optical buffer for storing packets received from each router, a traffic monitor for measuring a traffic of the initial path and the at least one additional path branched from the optical buffer, an optical delay line inserted in a stage downstream of measuring part of the traffic, and an optical cross-connect for connecting to the at least one additional path in downstream from the optical delay line and for adding and deleting the at least one additional path, and wherein the destination node apparatus comprises an optical cross-connect connected to the at least one additional path and for adding and deleting the at least one additional path, a traffic monitor for measuring a traffic of the initial path and the at least one additional path in a stage downstream of the optical cross-connect, an optical delay line inserted in a stage downstream of measuring part of the traffic, and an optical buffer for storing packets in a stage downstream of the optical delay line and for sending the packets to the router.

The present invention also concerns a system with a source node apparatus and a destination node apparatus in Internet Protocol/Wavelength Division Multiplexing network, having an initial path and at least one additional path between routers to be communicated, and adding and deleting the at least one additional path independently and asynchronously dependent on a traffic variation without signaling.

In particular, according to the present invention, the source node apparatus includes a traffic monitor for measuring traffic of packets received from the router, an optical delay line inserted in access-lines connected to the router, an optical cross-connect for adding and deleting the optical delay line, and a delay control means for inserting the optical delay line so as to provide a difference of delays between the two or more access-lines when the traffic monitor judges that additional paths should be added at substantially the same time to the two or more access-lines.

It is preferred that the delay control means starts a timer when the traffic monitor judges that an additional path should be added to one access-line, and inserts the optical delay line so as to provide a difference of delays between the two or more access-lines when the traffic monitor judges that additional paths should be added to other access-lines within a predetermined time period T.

It is also preferred that the delay control means inserts the optical delay line delaying by a time necessary to insert the optical delay line, to all the access-lines.

Furthermore, the present invention concerns a system with a source node apparatus and a destination node apparatus in Internet Protocol/Wavelength Division Multiplexing network, for having an initial path and at least one additional path between routers to be communicated, and for adding and deleting the at least one additional path independently and asynchronously dependent on a traffic variation without signaling.

In particular, according to the present invention, in the source node apparatus, the at least one additional path has i optical delay lines numerically equal to the sequence i of addition, where i is a positive integer, in the destination node apparatus, the initial path has n optical delay lines numerically equal to the number n of the added at least one additional path, and the at least one additional path has n–i optical delay lines numerically equal to a difference between the number n and the number i, where n is a positive integer, and each one optical delay line delays packets for a period of time that is necessary to add one additional path, and wherein the source node apparatus comprises a traffic monitor for measuring a traffic of packets received from the router, an optical delay line inserted in access-lines connected to the router, an optical cross-connect for adding and deleting the optical delay line, and a delay control means for inserting the optical delay line so as to provide a difference of delays between the two or more access-lines when the traffic monitor judges that additional paths should be added at substantially the same time to the two or more access-lines.

DESCRIPTION OF THE PREFERRED EMBODIMENTS

Figure 3:
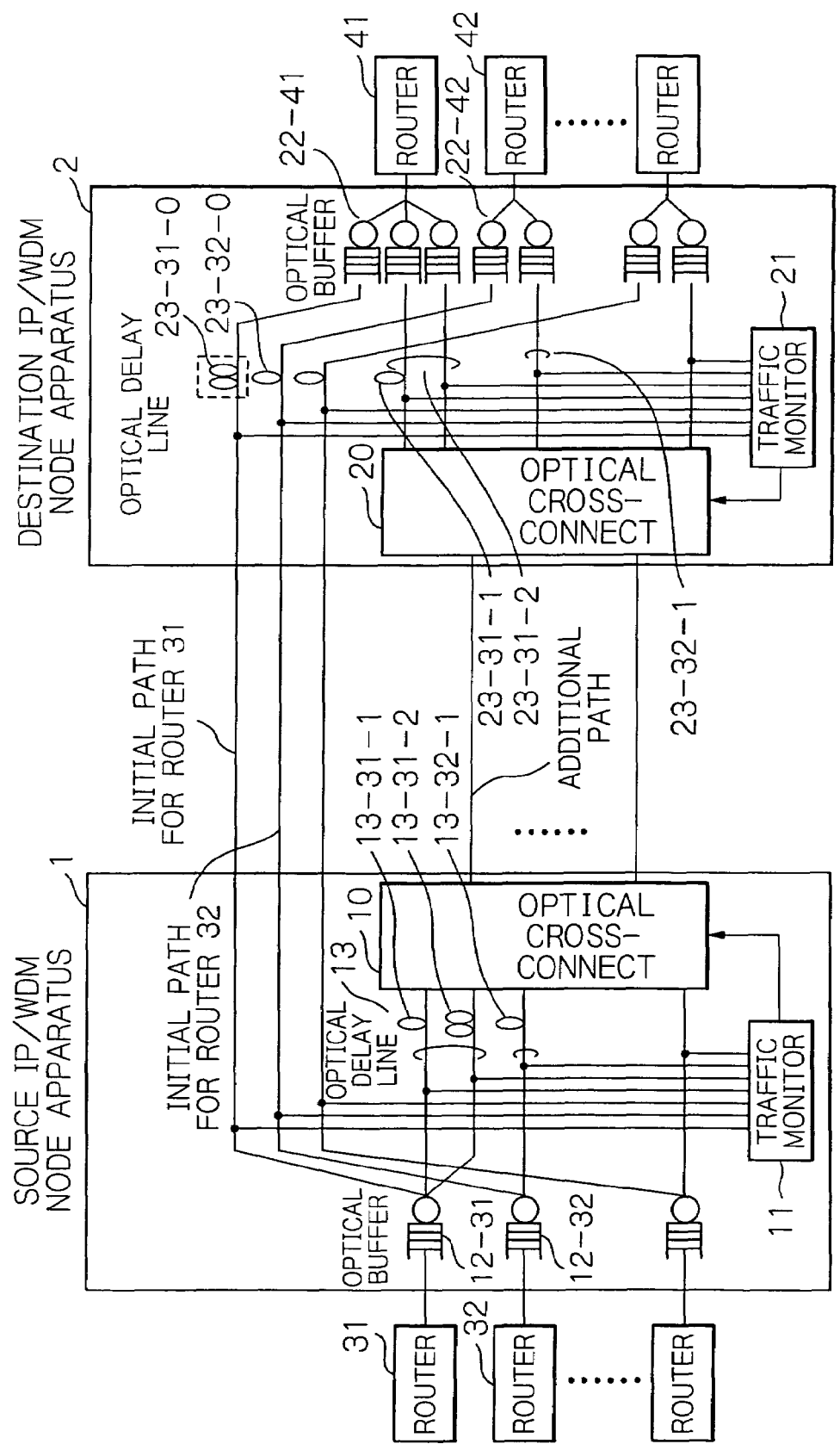
FIG. 3 illustrates a system configuration with node apparatuses as a first embodiment of the present invention.

FIG. 3 illustrates a system configuration with node apparatuses in a first embodiment according to the present invention. According to this system, an availability of additional path is not depended on a prediction accuracy of traffic.

Figure 1:
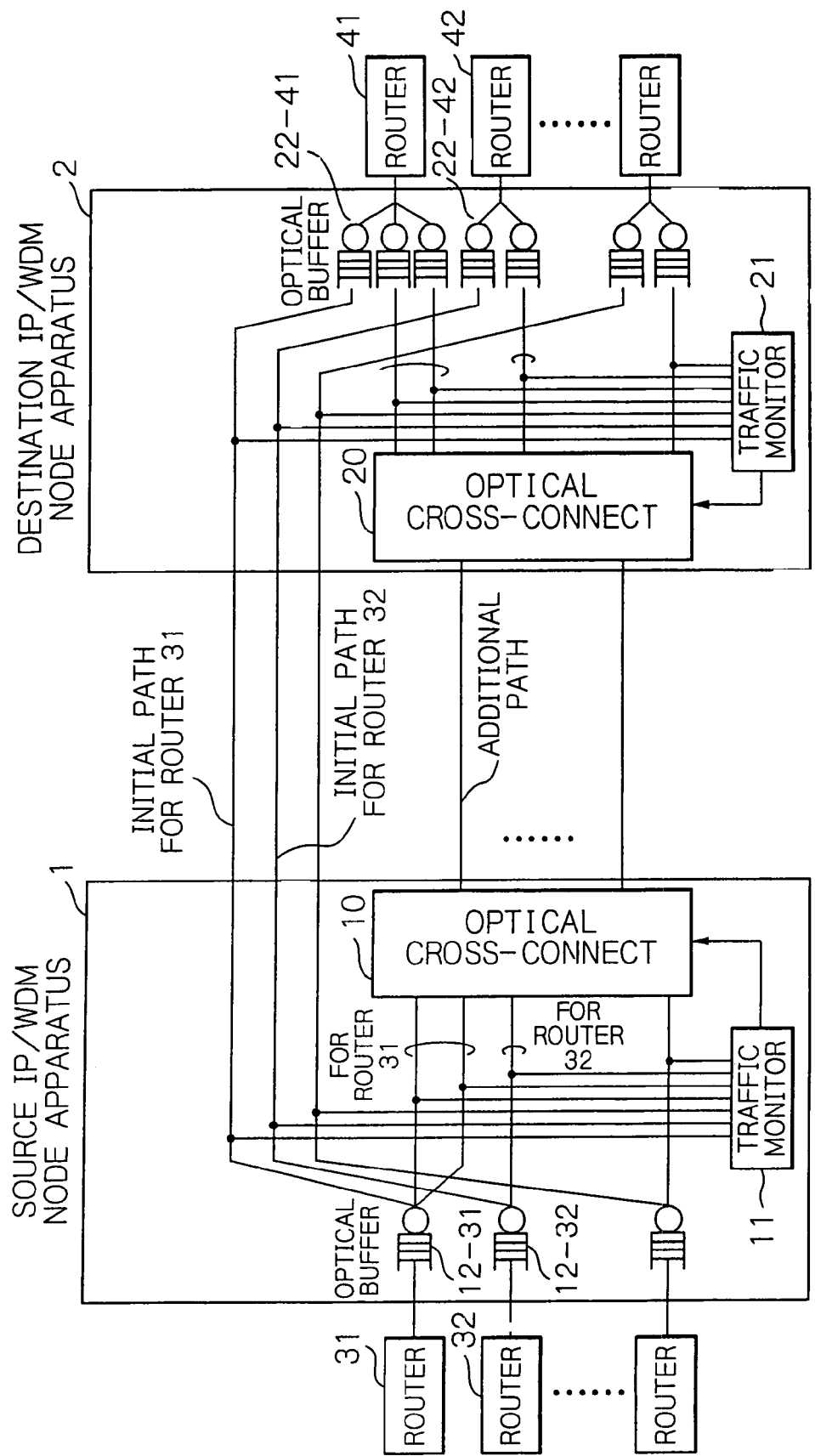
FIG. 1 illustrates a system configuration with the conventional node apparatuses.
Figure 2:
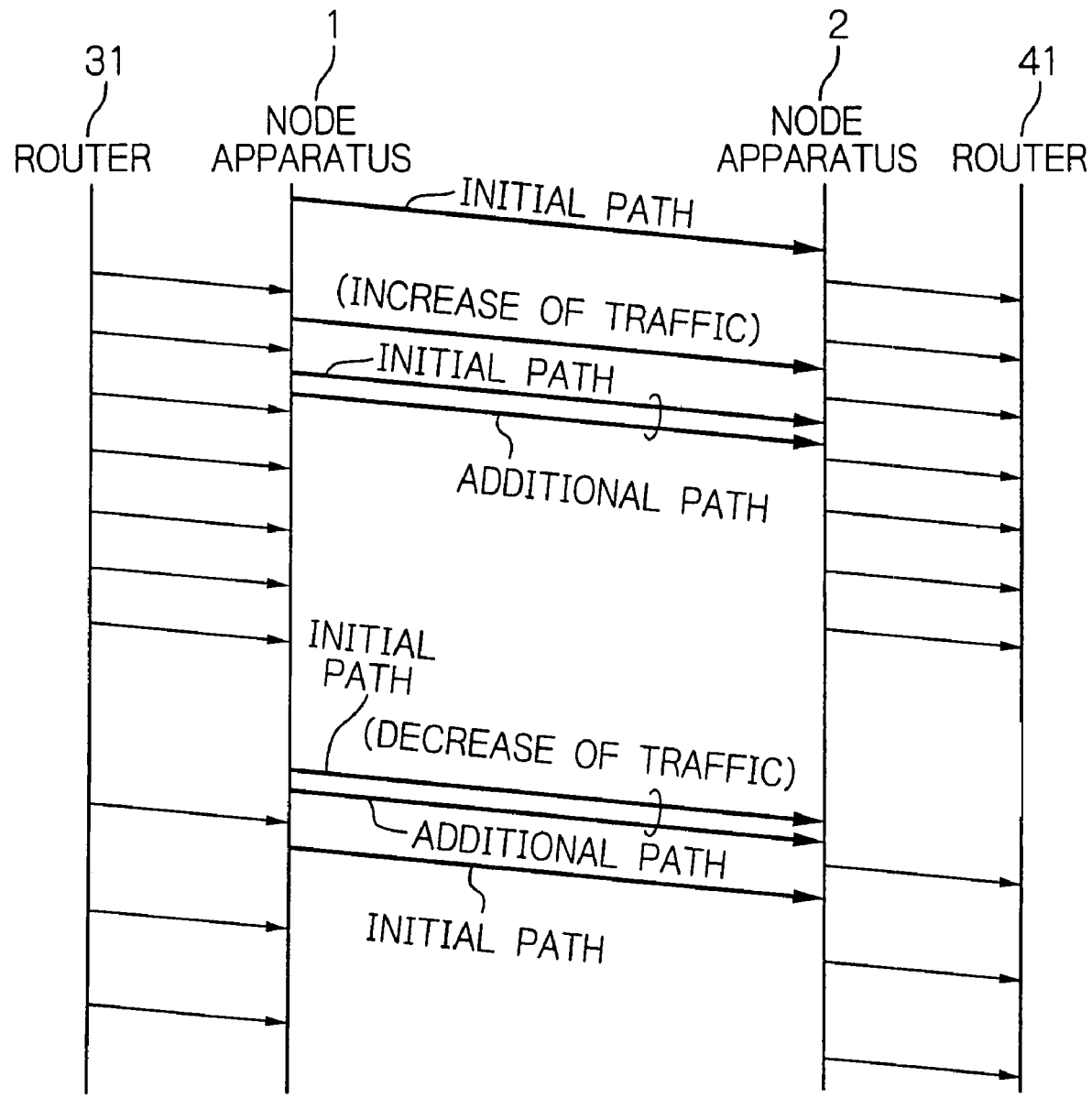
FIG. 2 illustrates a sequence between the conventional node apparatuses for adding and deleting a path of trunk-line independently and asynchronously.

As will be noted from FIG. 3 in comparison with FIG. 1, a source node apparatus 1 is provided with optical delay lines 13 at a downstream stage of means for measuring traffic. Also, a destination node apparatus 2 is provided with optical delay lines 23 at a downstream stage of means for measuring traffic.

First, the optical delay lines 13 in the source node apparatus 1 are explained. An optical buffer 12-31 for a router 31 is connected to two additional paths. A first additional path added firstly includes one optical delay line, and a second additional path added secondly includes two optical delay lines. That is, i optical delay lines numerically equal to the sequence i of addition are inserted in the additional path, where i is a positive integer. One optical delay line delays a packet between optical cross-connect 10 and 20 by time necessary for adding one additional path. When a traffic monitor 11 judges that an additional path is necessary, the optical cross-connect 10 adds one additional path and the packets transmitted through the additional path are delayed by the optical delay line 13. Therefore, the packets are not lost even if the additional path is added when the traffic exceeds the transmission capacity of the initial path or the additional path added lastly because the packets transmitted to a new additional path are delayed.

The number of the inserted optical delay lines in the source node apparatus is shown as follows, where n is a positive integer.

| initial path | 0 |
| 1st additional path | 1 |
| 2nd additional path | 2 |
| ... | |
| n-1-th additional path | n-1 |
| n-th additional path | n |

When the traffic transmitted through the n-th path in unit time t reaches X percent of the transmission capacity of the n-th path, the n+1-th additional path is added and the exceeded traffic over the capacity of the n-th path is output to the added n+1-th path. On the other hand, when the traffic transmitted through the n-th path in unit time t is less than the X percent of the transmission capacity of the n-th path, the n+1-th additional path is deleted.

Each of the optical delay line 13 gives a delay T equal to a delay difference between the n-th additional path and the n+1-th additional path. The delay T is determined larger than the maximum processing time from a detection of a path addition request by means of the traffic monitor 11 to a completion of a path addition by the optical cross-connect 10. As a result of this insertion of the delay, addition of the n+1-th additional path can be completed after the traffic monitor detects the path addition request from the traffic of the n-th additional path at the source node apparatus 1, and before the packets transmitted through the n+1-th additional path arrive at the destination node apparatus 2.

Second, the optical delay lines 23 in the destination node apparatus 2 are explained. For a router 41, an initial path has two optical delay lines 23-31-0 at a downstream stage of means for measuring traffic. An additional path added firstly has one optical delay line 23-31-1, and an additional path added secondly has no optical delay line. Thus, the difference of delays by the optical delay lines provided for the additional path in the source node apparatus 1 is absorbed by the optical delay lines provided for the additional path in the destination node apparatus 2. Therefore, the same delay will be given to the initial path and the additional paths between the routers, and no difference in delay will occur.

The number of the inserted optical delay lines in the destination node apparatus is shown as follows.

| initial path | n |
| 1st additional path | n-1 |
| 2nd additional path | n-2 |
| ... | |
| n-1-th additional path | 1 |
| n-th additional path | 0 |

The number of the optical delay lines in the initial path is the same as the predetermined number n of the additional paths determined dependent on the maximum traffic between the communicating routers. Therefore, the initial path may be beforehand provided with the optical delay lines of the fixed number numerically equal to the predetermined number n of the additional paths.

Figure 4:
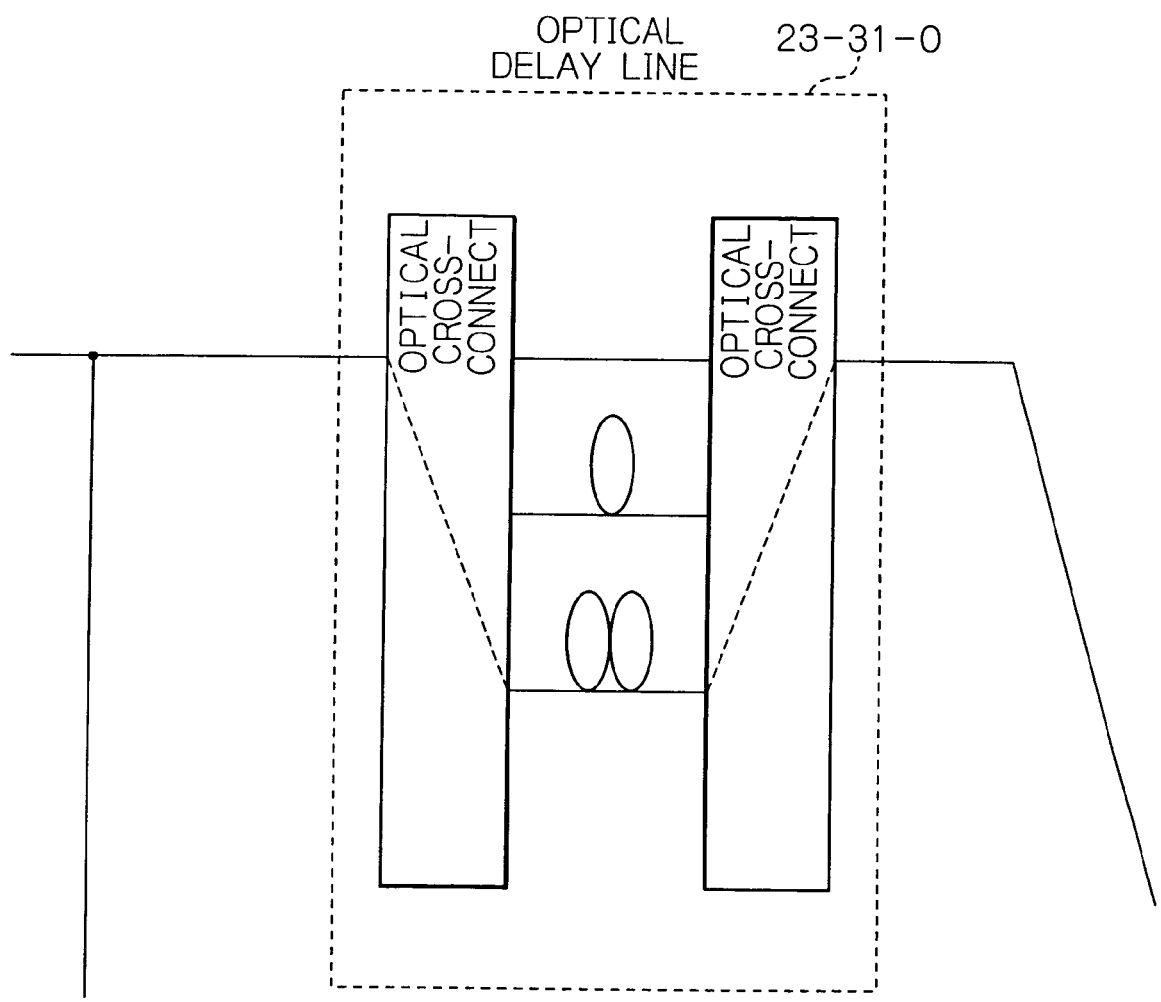
FIG. 4 illustrates a block diagram for changing the number of optical delay lines dependent on the number of additional paths in use in a destination node apparatus.

FIG. 4 illustrates a block diagram for changing the number of the optical delay lines in the destination node apparatus 2 dependent on the number of the additional paths in use.

As shown in FIG. 4, the number of the optical delay lines can be increased and decreased by the switching in two optical cross-connects. When an optical cross-connect 20 (FIG. 3) adds an additional path, the optical cross-connect 23-31-0 will switch to add one optical delay line. However, the operation for deleting the one optical delay line must be performed when no packet is remained in the optical delay line.

Figure 5:
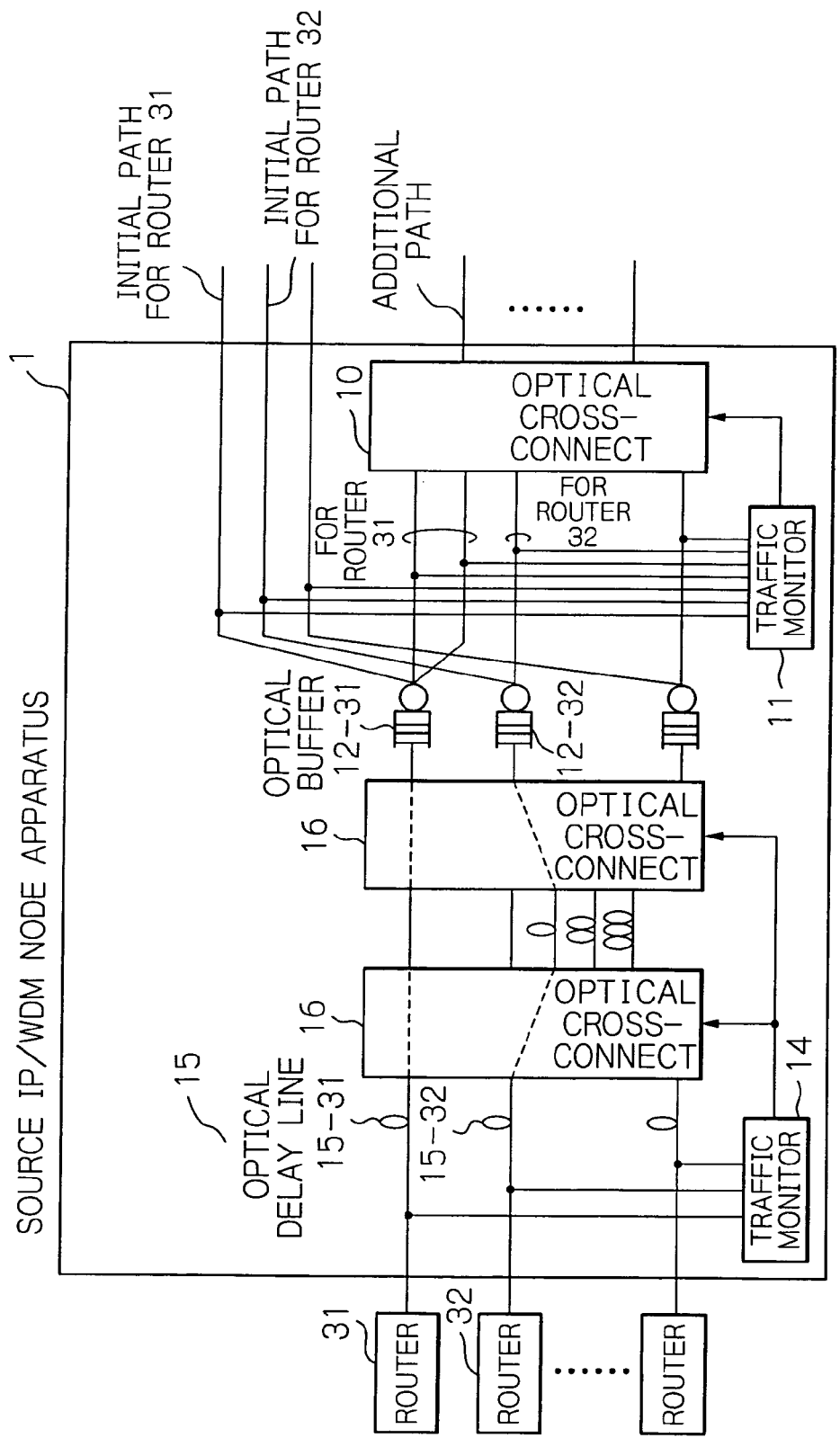
FIG. 5 illustrates a system configuration with node apparatuses as a second embodiment of the present invention.

FIG. 5 illustrates a system configuration with node apparatuses as a second embodiment of the present invention. This system intends to avoid that an additional path selected by the source node apparatus does not become the same as that of the destination node apparatus due to a slight time difference and to control errors.

As will be noted from FIG. 5 in comparison with FIG. 1, a source node apparatus 1 is provided with optical cross-connects 16 for controlling the number of optical delay lines inserted at an upstream stage of an optical buffer 12-31 or 12-32 that receives packets from a router 31 or 32. A traffic monitor 14 monitors the traffic in a plurality of the access-lines at the upstream of the optical cross-connects 16. In case that additional paths must be added at substantially the same time for two or more access-lines, the traffic monitor 14 will notify to add the additional paths to the optical cross-connects 16. In response to the notification, the optical cross-connects 16 insert an optical delay line so as to make a time interval for adding the respective additional paths. Thus, the additional paths are not added at substantially the same time for the two or more access-lines, and a time interval for adding the respective additional paths can be extended.

Furthermore, according the embodiment shown in FIG. 5, at the upstream of the optical cross-connects 16 and at the downstream of a connection point to the traffic monitor 14 for measuring the traffic, one optical delay line 15-31 or 15-32 is provided for each router. This optical delay line gives a delay larger than a time period from a notification of adding of an additional path by means of the traffic monitor 14 to a completion of a path addition by the optical cross-connects 10 and 20 of the respective node apparatuses 1 and 2.

The aforementioned "at substantially the same time" corresponds to "within a predetermined time period T". A path addition request for other access-lines may be detected within the predetermined time period T after the traffic monitor 11 detects a path addition request for one access-line. This predetermined time period T is represented as follows;

the maximum delay difference$\leq$T<T', where T' is a time period to be actually delayed, and the maximum delay difference is the maximum value of a transmission delay difference between the wavelengths of the traffic monitors 11 and 21 of the respective node apparatuses 1 and 2.

By providing a delay of the time period T' that is longer than the predetermined time period T, no additional path is added at substantially the same time for two or more access-lines. More concretely, when other path addition request is detected within the predetermined time period T after a detection of one path addition request, the optical delay line 15 delays packets in other access-lines by the time period T' that is longer than the predetermined time period T. Of course, if no path addition request is detected for other access-lines within the predetermined time period T after a detection of one path addition request, no optical delay line will be inserted as usual.

When a plurality of other path addition requests are detected within the predetermined time period T after a detection of one path addition request, packets in other access-lines are delayed by the time period T', 2T', 3T', ... in the generating order of the other path addition requests using the optical delay lines 15. Furthermore, if the shortest switching period of the optical cross-connects 10 and 20 is restricted by hardware or operation, it is possible to set up the time period T and T' to a value longer than the shortest period so as to expand the interval of event generation.

Following number of optical delay lines will be inserted when path addition requests occur at substantially the same time for the n access-lines;

| | |
|---|---|
| 1st access-line | no optical delay line |
| 2nd access-line | one optical delay line |
| 3rd access-line | two optical delay lines |
| ... | |
| n-1-th access-line | n-2 optical delay lines |
| n-th access-line | n-1 optical delay lines. |

Figure 6:
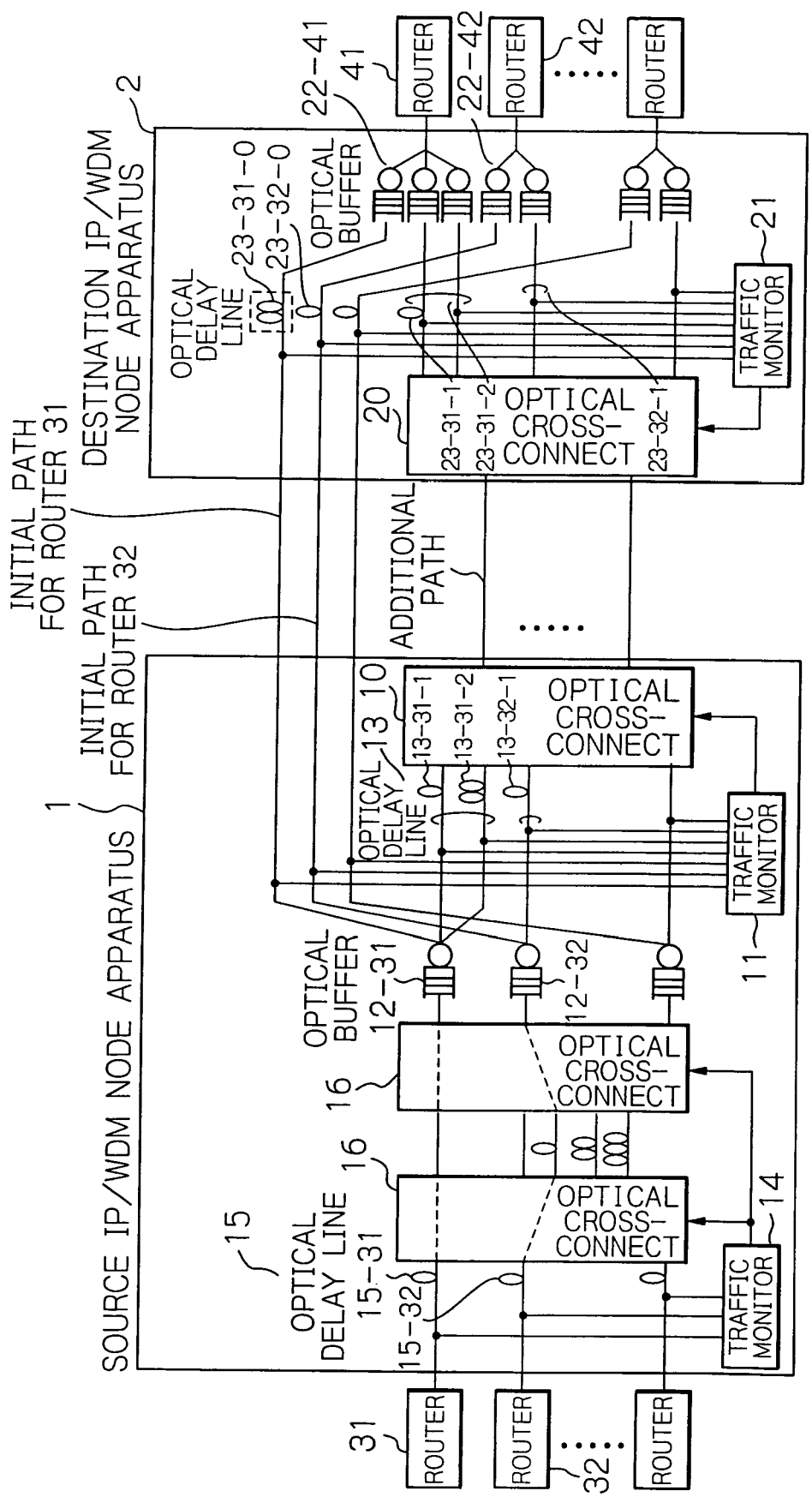
FIG. 6 illustrates a system configuration constituted by combining the systems of FIG. 3 and of FIG. 5.
Figure 7:
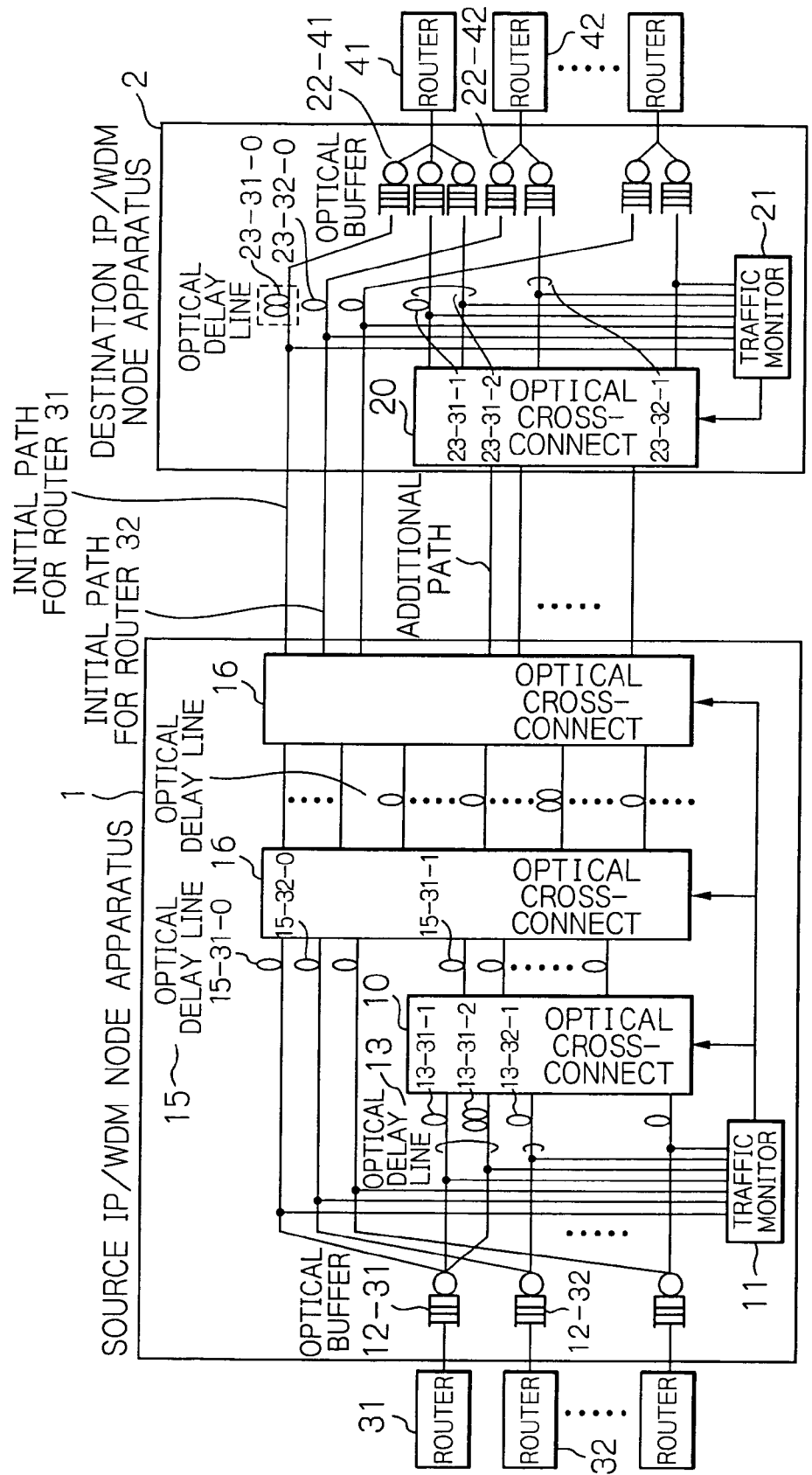
FIG. 7 illustrates a system configuration where a front part and a back part in the systems of FIG. 3 and of FIG. 5 are replaced.

FIG. 6 illustrates a system configuration constituted by combining the systems of FIG. 3 and of FIG. 5, and FIG. 7 illustrates a system configuration where a front part and a back part in the systems of FIG. 3 and of FIG. 5 are replaced. According to the present invention, modifications as shown FIGS. 6 and 7 can be established. As will be easily understood from these figures, detail explanations of configurations, operations and advantages of these modifications are omitted.

As mentioned in detail above, according to the system of the present invention, in the node apparatus for adding or deleting a path independently and asynchronously, the additional path can be efficiently added dependent on an actual traffic without prediction of the traffic by inserting optical delay lines. Furthermore, additional paths selected by the respective node apparatuses can become always coincidence because of avoiding the critical time interval for adding the additional paths at substantially the same time.

Many widely different embodiments of the present invention may be constructed without departing from the spirit and scope of the present invention. It should be understood that the present invention is not limited to the specific embodiments described in the specification, except as defined in the appended claims.

What is claimed is:

1. A system, comprising:
   a source node apparatus;
   a destination node apparatus;
   said source node apparatus and said destination node apparatus both being in an Internet Protocol/Wavelength Division Multiplexing network;
   an initial path connecting the source node apparatus to the destination node apparatus;
   a first router associated with the source node apparatus;
   a second router associated with the destination node apparatus;
   a optical cross-connect associated with the source node apparatus and configured to add and delete n additional paths between the first and second routers without signaling the destination node apparatus, n being a positive integer,
   wherein in said source node apparatus, each additional path has i optical delay lines, i being a positive integer that is equal to a corresponding sequential number of said n additional paths,
   in said destination node apparatus, said initial path has n optical delay lines, each additional path has an amount of optical delay lines equal to a difference between n and i, and
   each optical delay line is configured to delay packets for a period of time equal to a time to add one additional path.

2. The system as claimed in claim 1, wherein said destination node apparatus comprises a changing unit configured to change the number n of said optical delay lines inserted to said initial path dependent on addition and deletion of said at least one additional path.

3. The system as claimed in claim 1, wherein said source node apparatus comprises:
   an optical buffer configured to store packets received from the first and second routers, and
   a traffic monitor configured to measure a traffic of said initial path and said at least one additional path branched from said optical buffer and
   an optical delay line in a stage downstream of the traffic.

4. A system, comprising:
   a source node apparatus;
   a destination node apparatus;
   said source node apparatus and said destination node apparatus both being in an Internet Protocol/Wavelength Division Multiplexing network;
   an initial path connecting the source node apparatus to the destination node apparatus;
   a first router associated with the source node apparatus;
   a second router associated with the destination node apparatus;
   a optical cross-connect associated with the source node apparatus and configured to add and delete n additional paths between the first and second routers without signaling the destination node apparatus, n being a positive integer, wherein in said source node apparatus, each additional path has i optical delay lines, i being a positive integer that is equal to a corresponding sequential number of said n additional paths, and in said destination node apparatus, said initial path has n optical delay lines, each additional path has an amount of optical delay lines equal to a difference between n and i, each optical delay line is configured to delay packets for a period of time equal to a time to add one additional path, and said source node apparatus includes a traffic monitor configured to measure a traffic of packets received from said first router, an optical delay line inserted in access-lines connected to said first router, and a delay control unit configured to insert the optical delay line so as to provide a difference of delays between two or more access-lines when said traffic monitor judges that additional paths should be added at substantially the same time to said two or more access-lines.

* * * * *